(12) United States Patent
Pfeil et al.

(10) Patent No.: US 6,655,506 B2
(45) Date of Patent: Dec. 2, 2003

(54) ELECTROMECHANICAL PARKING BRAKE

(75) Inventors: Michael C. Pfeil, South Charleston, OH (US); Gary C. Fulks, Dayton, OH (US); Douglas E. Poole, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/036,899

(22) Filed: Dec. 26, 2001

(65) Prior Publication Data
US 2003/0116389 A1 Jun. 26, 2003

(51) Int. Cl.⁷ ............................................. B60T 13/04
(52) U.S. Cl. ........................................ 188/156; 188/171
(58) Field of Search .................................. 188/156, 158, 188/161, 162, 171

(56) References Cited

U.S. PATENT DOCUMENTS

| | | | | |
|---|---|---|---|---|
| 4,480,720 A | * | 11/1984 | Shimano | 188/24.15 |
| 5,180,038 A | * | 1/1993 | Arnold et al. | 188/171 |
| 6,213,259 B1 | * | 4/2001 | Hanson et al. | 188/156 |
| 6,401,879 B1 | * | 6/2002 | Drennen et al. | 188/158 |
| 6,431,329 B1 | * | 8/2002 | Huber et al. | 188/33 |
| 2002/0084154 A1 | * | 7/2002 | Peter | 188/156 |

* cited by examiner

Primary Examiner—Christopher P. Schwartz
(74) Attorney, Agent, or Firm—Scott A. McBain

(57) ABSTRACT

An assembly for actuating a parking brake comprises a screw, a nut mounted for translation on the screw, and a cable connected between the brake and the nut. A compliant element is mounted on the screw, and is adapted to expand axially with a change in tension in the cable.

19 Claims, 1 Drawing Sheet

ELECTROMECHANICAL PARKING BRAKE

TECHNICAL FIELD OF THE INVENTION

The present invention relates generally to brakes for motor vehicles, and more particularly to an apparatus for sensing variation in applied load of a parking brake actuator.

BACKGROUND OF THE INVENTION

Most vehicle designs incorporate parking brakes. Typical parking brake configurations employ regular drum brakes on a rear wheel with a simple mechanical linkage to engage brake shoes to their respective drums. For instance, an actuator may pull a steel brake cable taut in response to an operator depressing a pedal, lever or button. The resultant tension on the cable is transferred to the end of a brake lever. Other cables may draw the brake shoes firmly against the drums in response to rotation of the lever. A release knob or button causes the actuator to return to its initial position, reintroducing slack into the cables and, consequently, disengaging the brake shoes.

The reliability and integrity of brake performance depends largely upon the manner in which the actuator releases tension in the brake cable. For instance, should the actuator release too much cable, over-release will result. This condition requires the actuator to reel in excessive cable slack prior to a next application, translating into system delays and damage. Conversely, too little release of the cable may result in a brake drag. Such a condition occurs when the brake pads do not fully release. Brake drag retards vehicle performance while causing overheating and damage to brake pads and other system components.

To reduce the occurrence of over-release and drag, some brake manufacturers incorporate systems that use either position or periodic force adjustments to regulate cable release. In particular, one type of position adjustment is made by a position adjuster proximate to the actuator that periodically retracts cable slack to compensate for lining wear and stretching. Another type of position adjustment is made by a position-based release mechanism that consistently moves the actuator a preset distance that ideally corresponds to an optimum brake release point. The preset distance needs to be manually adjusted at service intervals to compensate for system wear factors. In practice, even if serviced regularly, cable stretching and other aging factors cause release points to substantially migrate in between adjustments, allowing the problems of over-release and brake drag. In addition, some users do not service the braking system regularly.

Closed loop position feedback is known in other types of powered mechanisms. In particular, improved position adjustment is achieved with linear position feedback from a sensor (e.g. linear variable displacement transducer (LVDT), linear resistive potentiometers, and optical sensors). However, these sensors are expensive and prone to reliability limitations due to wear and contaminants.

SUMMARY OF THE INVENTION

The present invention is an assembly for actuating a parking brake. The assembly comprises a screw, a nut mounted for translation on the screw, and a cable connected between the brake and the nut. A compliant element is mounted on the screw, and is adapted to expand axially with a change in tension in the cable.

Accordingly, it is an object of the present invention to provide a parking brake actuator of the type described above which reliably senses any change in steady state position of the nut.

Another object of the present invention is to provide a parking brake actuator of the type described above which can be electronically operated.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PREFERRED EMBODIMENT

Figure 1:
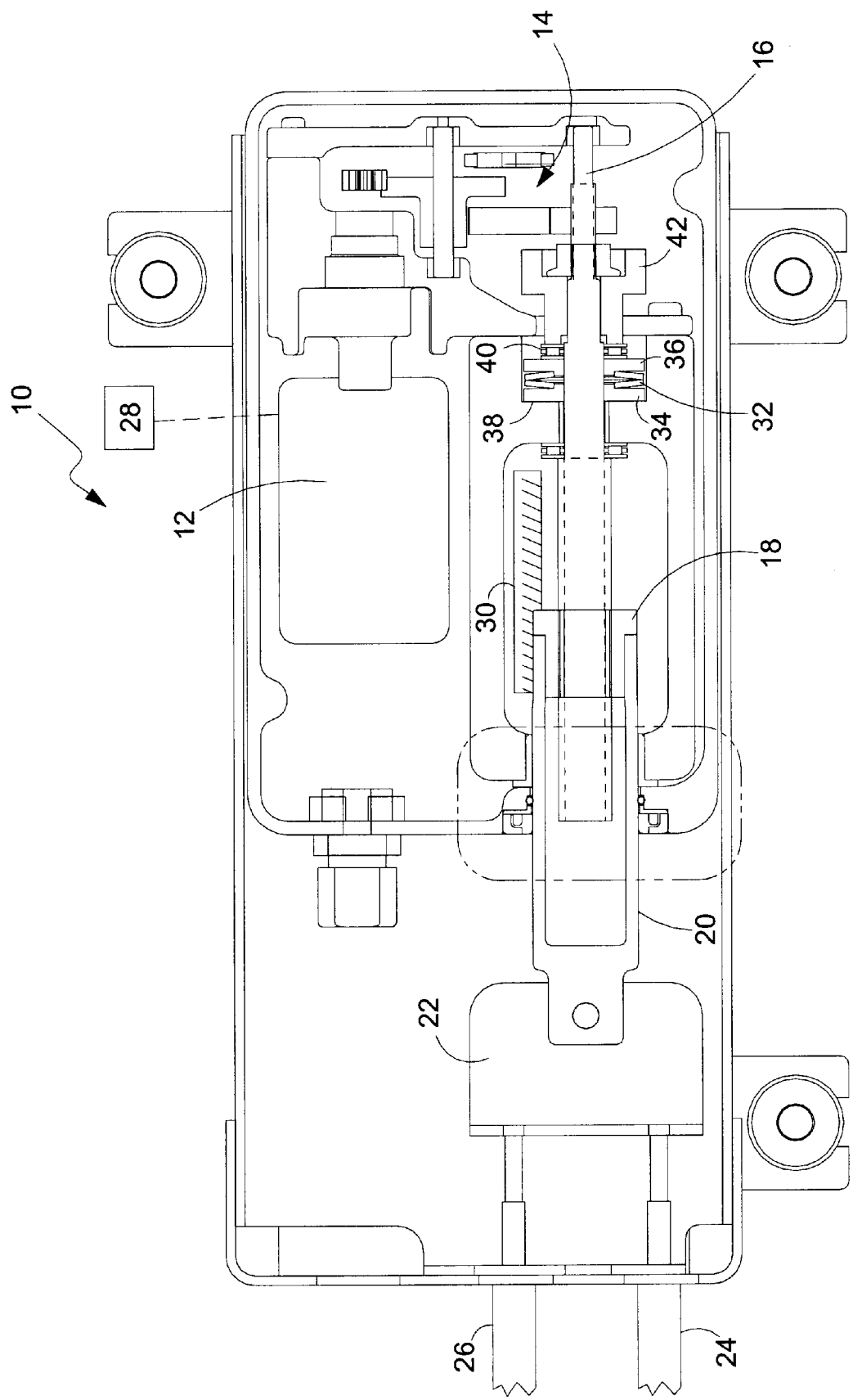
FIG. 1 is a cross-sectional view of a parking brake actuator according to the present invention.

FIG. 1 shows one embodiment of a parking brake actuator 10 according to the present invention including a motor 12. The motor 12 is preferably a direct current motor, and drives a gear train 14 of any suitable configuration to rotate a screw 16. A nut 18 is threadingly engaged with the screw 16 such that the nut translates linearly as the screw rotates. The nut 18 is fixed to a tube 20, which in turn is pivotably attached to a force balancer 22. A pair of cables 24 and 26, one for each of the rear wheel brakes, is attached to the force balancer 22. A single cable configuration is also acceptable and functions identically except the force equalization is performed external to the apparatus in FIG. 1.

A force transducer or other suitable force sensor measures the tension in cables 24 and 26. The force may be measured in terms of motor current or by any other conventional standard. The force transducer relays the measured force back to a controller 28, which operates the motor 12 until a preset load registers at the transducer. For instance, the motor 12 may continue to operate until zero pounds of force is indicated. Further details of this arrangement are described in U.S. patent application Ser. No. 09/930,890 filed Aug. 16, 2001, entitled "Multiple Hall Effect Position Sensor" and hereby incorporated by reference.

Once the preset load is achieved, a control program advantageously instructs the controller 28 to transition from operation within a force control mode to a position control mode. A position sensor is provided to furnish information to the controller 28 to reliably release the parking brake without brake damage due to brake drag from under release, and to avoid undue vibration and damage to the parking brake system due to over-release. In a preferred embodiment, the position sensor takes the form of a slide potentiometer shown schematically at 30 provided proximate the nut 18.

In conjunction with the position sensor, a compliant spring element 32 detects any change in the desired steady load on the cables 24 and 26. The compliant element 32 may be a bellville washer, and is disposed around the screw 16 between a pair of flat washers 34 and 36. The flat washer 34 in turn bears against a relatively stationary shoulder 38, while the flat washer 36 bears against a thrust bearing 40 and a retaining nut 42 to fix the flat washer 36 relative to the screw 16. In effect, the compliant element 32 extends to take up any slack in the cables 24 and 26.

The position $x_p$ of the nut 18 as measured by the potentiometer 30 is equal to the deflection $x_s$ of the compliant element 32 subtracted from the position $x_n$ of the nut relative to the screw. Because the nut 18 is fixed relative to the screw 16, $x_s$ is equal to the inverse of $x_p$. Also because the nut 18 is fixed, any drop in cable tension T is equal to the spring rate $k_s$ of the compliant element multiplied by the change in position $x_s$ of the compliant element. Combining these two equations, the change in the absolute position $x_p$ of the nut is equal to the inverse of the change in cable tension divided by the spring rate $k_s$ of the compliant element. Knowing the spring rate of the compliant element thus allows the system to determine the change in cable force from a change in potentiometer output. If the change in cable force is greater than a predetermined value the actuator can reapply or release as the measured change in force dictates. In practice, the sensitivity and usable range are determined by the stiffness and active length of the compliant element, and the compliance of the loading system including the brake cables and wheel brake mechanisms.

While the embodiment of the invention disclosed herein is presently considered to be preferred, various changes and modifications can be made without departing from the spirit and scope of the invention. For instance, slots may be provided in the periphery of the plunger to serve as the anti-rotation feature, or a permanent magnet with annular pole pieces and a non-magnetic housing may be substituted for the like parts described above. The scope of the invention is indicated in the appended claims, and all changes that come within the meaning and range of equivalents are intended to be embraced therein.

What is claimed is:

1. An assembly for actuating a parking brake, the assembly comprising:
   a screw defining an axis;
   a nut mounted for translation on the screw during actuation of the parking brake;
   a cable connected between the brake and the nut; and
   a compliant element mounted on the screw and axially spaced from the nut, the compliant element being adapted to expand axially with a change in tension in the cable.

2. The assembly of claim 1 further comprising a motor in driving engagement with the screw.

3. The assembly of claim 1 further comprising a second cable connected to the nut.

4. The assembly of claim 3 wherein the second cable is connected to a second brake.

5. The assembly of claim 1 wherein the compliant element comprises a bellville washer.

6. The assembly of claim 1 further comprising a tube connected between the nut and the cable.

7. The assembly of claim 1 further comprising a force balancer connected between the nut and the cable.

8. The assembly of claim 1 further comprising a force balancer connected to the cable, and a tube connected between the force balancer and the nut.

9. A parking brake release mechanism for powered release of a parking brake cable coupled to a wheel brake, the parking brake release mechanism comprising:
   a screw defining an axis;
   a nut connected between the cable and the screw and translatable during actuation of the parking brake; and
   a compliant element mounted on the screw and axially spaced from the nut, the compliant element being adapted to expand axially with a change in tension in the cable.

10. The assembly of claim 9 further comprising a motor in driving engagement with the screw.

11. The assembly of claim 9 further comprising a second cable connected to the nut.

12. The assembly of claim 11 wherein the second cable is connected to a second brake.

13. The assembly of claim 9 wherein the compliant element comprises a bellville washer.

14. The assembly of claim 9 further comprising a tube connected between the nut and the cable.

15. The assembly of claim 9 further comprising a force balancer connected between the nut and the cable.

16. The assembly of claim 9 further comprising a force balancer connected to the cable, and a tube connected between the force balancer and the nut.

17. An assembly for actuating a parking brake on first and second wheels, the assembly comprising:
   a screw defining an axis;
   a nut mounted for translation on the screw during actuation of the parking brake;
   a first cable connected between the first brake and the nut;
   a second cable connected between the second brake and the nut;
   a belleville washer mounted on the screw and axially spaced from the nut, the belleville washer adapted to expand axially with a change in tension in the cable; and
   a motor in driving engagement with the screw.

18. The assembly of claim 17 further comprising a tube connected between the nut and the first and second cables.

19. The assembly of claim 17 further comprising a force balancer connected between the nut and the first and second cables.

* * * * *